United States Patent [19]
Mark

[11] 3,792,372
[45] Feb. 12, 1974

[54] MEANS FOR ENSURING STARTING OF GAS LASER

[75] Inventor: John Thomas Mark, Lancaster, Pa.

[73] Assignee: RCA Corporation, New York, N.Y.

[22] Filed: June 12, 1972

[21] Appl. No.: 261,779

[52] U.S. Cl.............. 331/94.5, 330/4.3, 313/198, 313/199, 313/200, 315/59, 315/60, 315/335
[51] Int. Cl............... H01s 3/09, H01s 3/22
[58] Field of Search............ 331/94.5; 330/4.3; 313/198–201; 315/59, 60, 335

[56] References Cited
UNITED STATES PATENTS
2,636,145   4/1953   Stutsman .......................... 313/198
3,662,284   5/1972   Beaulieu et al. .................. 331/94.5

OTHER PUBLICATIONS
Hernquist, RCA Review, Vol. 30, Sept. 1969, pp. 429–433.

Sandeman, Radio Engineering, Vol. 1, J. Wiley & Sons, Inc., New York, (1948), pp. 450–464–see pp. 456, 462, etc.

Primary Examiner—Ronald L. Wibert
Assistant Examiner—R. J. Webster
Attorney, Agent, or Firm—Glenn H. Bruestle; George J. Seligsohn; Irwin M. Krittman

[57] ABSTRACT

By employing a serially-connected, resistance of 20 to 500 megohms between an additional starting electrode and the anode of a gas laser tube, the starting of a discharge between the anode and cold cathode thereof is ensured without the danger of tube-destroying parasitic oscillations.

5 Claims, 3 Drawing Figures

PRIOR ART

MEANS FOR ENSURING STARTING OF GAS LASER

This invention relates to gas lasers employing cold cathodes and, more particularly, to an improved cold cathode gas laser incorporating means for ensuring that a gas discharge of the type necessary and sufficient to provide lasing is always initiated, even under adverse conditions.

As is known, when a gas-filled laser tube having a bore member defining a longitudinal bore is situated so that the bore is within an optical resonant cavity and a sufficiently strong discharge takes place through the bore to effect pumping of the laser, lasing takes place and a beam of coherent light parallel to the axis of the bore is generated. (In certain types of gas lasers, such as copper for instance, lasing takes place in response to a sufficiently strong discharge even when the tube is not within an optical resonant cavity.)

In a sealed gas laser, it is often deirable to provide a relatively large reservoir of gas as part of the gas-filled laser tube in order to obtain long life therefrom. In this case, the anode and cold cathode electrodes are located with respect to the bore member so that a discharge therebetween will extend through the bore, even when the bore member is surrounded by a reservoir of gas filling the laser tube. This means that the discharge extending from the cold cathode to the anode to the laser bore of the bore member will normally be relatively long in length and relatively small in cross section.

The conventional way to both initiate a discharge and maintain a discharge in a gas laser tube is simply to apply a single voltage of sufficient magnitude between the anode and cold cathode. This performs the dual functions of first breaking down the gas within the bore to initiate the discharge therethrough and then, once established, permitting the magnitude of the voltage to drop to a level sufficient to sustain the discharge through the bore at the required current density. There are times, particularly under adverse conditions, when breakdown of the gas in the bore fails to take place, so that a discharge is not initiated and lasing does not take place. For instance, a laser tube may be encapsulated in a container, such as described in my copending patent application Ser. No. 154,826, filed June 21, 1971, now U.S. Pat. No. 3,739,297 and assigned to the same assignee as the present application. In this case, prior to the initiation of a discharge in the laser tube, the laser is in total darkness and it is normally at a relatively low temperature, both of which are adverse conditions for breaking down the gas to initiate discharge. This lowers the reliability with which a discharge can be initiated in a laser tube in response to the application of the laser pumping voltage across the anode of the cold cathode.

One way of attempting to solve this reliability problem, employed by the prior art and discussed below in more detail in connection with FIG. 1, is to directly electrically connect the anode, which is located towards one end of the bore of the laser tube through a conductive wire loop which surrounds a region of the bore towards the end thereof which is opposite the end thereof with which the anode is associated. Although the presence of this wire loop is effective in ensuring the initiation of a discharge in the bore of the laser tube, it has been found that the use of the conductive wire loop directly connected to the anode adds capacitance to the anode that will in a significant number of cases cause the laser tube to parasitically oscillate at high frequency and destroy itself.

The present invention is directed to means for ensuring the initial breakdown of the gas in the bore and the establishment of a discharge therethrough which is not subject to parasitic oscillation. Briefly, in accordance with applicant's invention, such means include an additional electrode situated in cooperative relationship with a region of the laser tube which region is spatially displaced and electrically separated from the anode and cold cathode electrodes, and means for serially-connecting electrically this additional electrode to the anode eletrode directly through a resistance having a value between 20 and 500 megohms.

These and other features and advantages of the present invention will become more apparent from the following detailed description, taken together with the accompanying drawing, in which.

Figure 1:
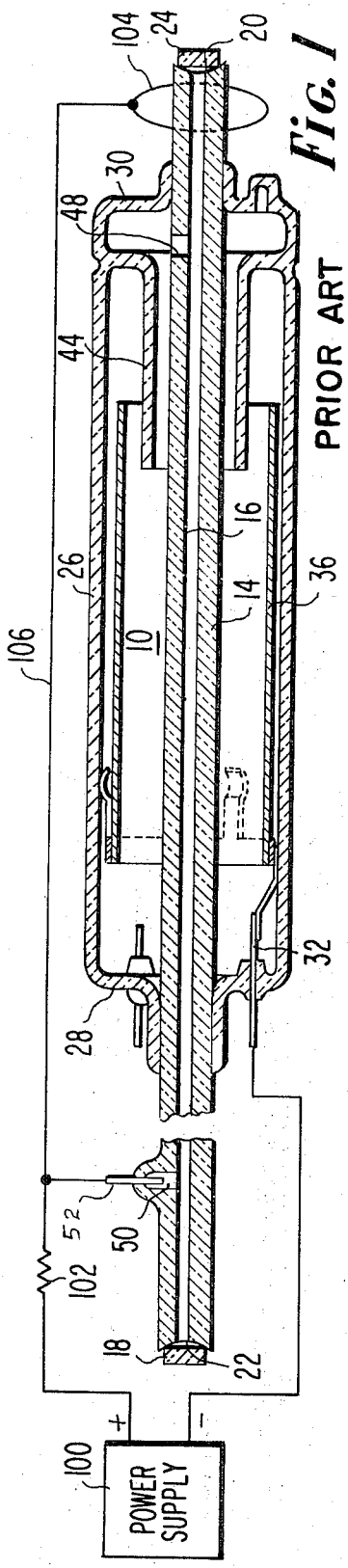
FIG. 1 is an illustrative showing of prior art means for ensuring that a discharge is started in a gas laser tube.
Figure 2:
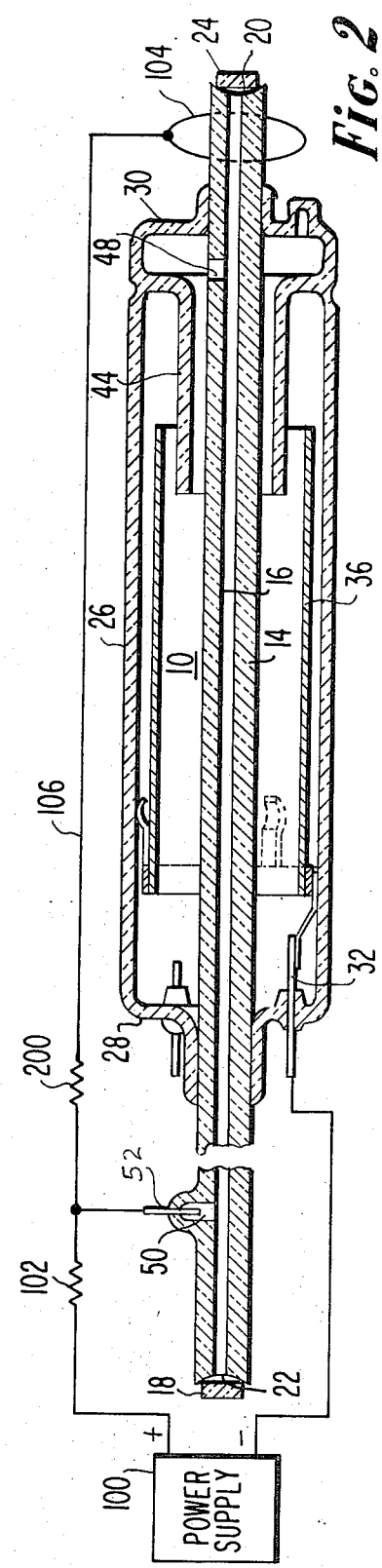
FIG. 2 is a first embodiment of applicant's invention for ensuring the start of a discharge in a gas laser tube.
Figure 3:
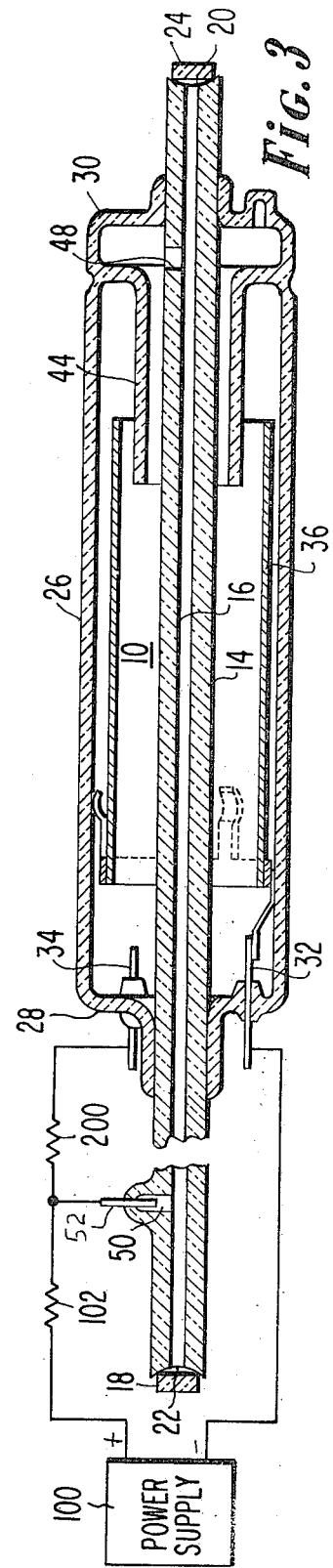
FIG. 3 is a second embodiment of applicant's invention for ensuring the start of a gas discharge in a laser tube.

For illustrative pruposes only, the gas laser tube shown in each of FIGS. 1, 2 and 3 is the same as the gas laser tube more fully disclosed in my copending U.S. Pat. application Ser. No. 154,826, referred to above.

Referring now to FIG. 1, there is shown a laser tube 10, incorporating the bore member 14 defining a longitudinal bore 16 therthrough. Bore member 14 is terminated at its left end 22 by left reflector 18 and is terminated at its right end 20 by right reflector 24. Reflectors 18 and 24 define the laser optical resonant cavity. At least one of the reflectors, such as reflector 24, is partially transmissive to provide a laser output.

A bulb 26, surrounding a portion of bore member 14, is attached to the outside of bore member 14 at its left end 28 and at its right end 30. The interior volume defined by bulb 26 communicates the bore 16 through hole 48 through the wall of bore member 14.

Cold cathode 36, within bulb 26, is coaxial with the length of bore 16 and is electrically connected to the outside of laser tube 10 by pins 32. Anode 52, which passes directly through the wall of bore member 14, provides an electrical connection between anode region 50 of bore 16 and the outside of laser tube 10.

Any discharge which takes place between anode 52 and cathode 36 passes through anode region 50, bore 16, hole 48 and the interior of bulb 26 to cathode 36. Shield 44 is employed to reduce sputtering of cathode 36 in response to such a discharge.

As is known in the art, a discharge will take place between anode 52 and cathode 36 in response to a voltage from power supply 100 being applied across anode 52 and cathode 36. In particular, anode 52 is connected to the positive terminal of power supply 100 through resistance 102 which is serially connected between the positive terminal power supply 100 and anode 52. A negative terminal of power supply 100 is directly connected to cathode 36 through pin 32.

The prior art means for ensuring the breakdown of the gas takes place and the discharge always occurs is a conductive wire loop 104, which, as shown, surrounds bore member 14 towards right end 20 thereof, while anode 52 is located towards the left end 22 of bore member 14. It is therefore necessary to employ a length of wire 106 to conductively connect anode 52 to conductive wire loop 104.

The direct connection of wire loop 104 to anode 53 through a relatively long connecting wire 106 adds capacitance which on a significant number of occassions results in parasitic high frequency oscillations resulting in laser tube in response to a discharge therein. Such oscillations destroy the laser tube.

This problem is overcome by the present invention, a first embodiment of which is shown in FIG. 2, and a second embodiment of which is shown in FIG. 3.

Specifically as shown in FIG. 2, it has been found that the effects of the high capacitance in the arrangmment of FIG. 1 with the resulting parasitic oscillations can be prevented by substituting for direct connection 106 in FIG. 1 a very high resistance 200, which is serially connected between anode 52 and wire loop 104. It has been found that any resistance value of resistance 200 extending from 20 megohms to 500 megohms is normally effective in both ensuring that a discharge is initiated in bore 14 and preventing the occurrence of parasitic oscillations. However, optimum performance occurs in a more limited resistance range of resistance 200 between the 100 megohms and 200 megohms. Thus, a value for resistance 200 of between 100 megohms and 200 megohms is to be preferred.

In the embodiment shown in FIG. 3, wire loop 104 is dispensed with and resistance 200 is serially connected between anode 52 and an additional electrode provided by pin 34 which extends through left end 28 of bulb 26, as shown. Thus, pin 34 acts as an auxiliary anode within the tube situated with respect to said cold cathode electrode to define a gas-filled region extending therebetween which has a ratio of length to cross section which is low relative to the ratio of length to cross section of the bore between cold cathode 26 and main anode 52. The arrangement in the embodiment of FIG. 3 is just as effective as the arrangement of the embodiment of FIG. 2 in both ensuring that a discharge is initiated in bore 14 and that the occurrence of parasitic oscillation is prevented, so long as the resistance 200 has a resistive value in the range between 20 and 500 megohms, and, preferably, in the more limited range of 100–200 megohms.

What is claimed is:

1. In a gas laser comprising a sealed gas-filled tube including a bore member defining a longitudinal bore and anode and cold cathode electrodes located in cooperative relationship with said bore member for establishing a discharge of a given strength therebetween which extends through the length of said bore in response to both an initial breakdown of said gas and the application of a voltage of a given magnitude across said electrodes, lasing by said tube requiring that said discharge occurs, said given magnitude of said voltage being insufficient in and as of itself of ensure that initial breakdown of said gas will always take place; the improvement therewith of means for ensuring that said initial breakdown of said gas alway takes place comprising a resistance having a value between twenty and five hundred megohms, an additional electrode situated in cooperative relationship with a region of said tube which region is spatially displaced and electrically separated from said anode and cold cathode electrodes, and means for electrically serially connecting said additional electrode to said anode electrode directly through said resistance.

2. The gas laser defined in claim 1, wherein said anode electrode is situated at a first linear position towards one end of said bore member, wherein said additional electrode is conductive loop surrounding said bore member and situated at a second linear position towards the end thereof opposite to said one end, whereby the portion of said bore is cooperative relationship with said conductive loop is said region of said tube, and wherein said cold cathode electrode is a cylinder coaxial with and surrounding said bore member and said cold cathode has its entire length situated intermediate said first and second linear positions.

3. The gas laser defined in claim 1, wherein said additional electrode is an auxiliary anode within said tube situated with respect to said cold cathode electrode to define a gas-filled region extending therebetween which has a ratio of length to cross section which is low relative to the ratio of length to cross section of said bore between said cold cathode electrode and said first mentioned electrode.

4. The gas laser defined in claim 1, further including a power supply for applying said voltage.

5. The gas laser defined in claim 1, wherein the value of said resistance is between one hundred and two hundred megohms.

* * * * *

UNITED STATES PATENT OFFICE
CERTIFICATE OF CORRECTION

Patent No. 3,792,372　　　　　　　Dated February 12, 1974

Inventor(s)　　John Thomas Mark

It is certified that error appears in the above-identified patent and that said Letters Patent are hereby corrected as shown below:

Claim 1, column 4, line 12, after "itself", "of" should read --to--.

Signed and sealed this 21st day of May 1974.

(SEAL)
Attest:

EDWARD M. FLETCHER, JR.　　　　　　　C. MARSHALL DANN
Attesting Officer　　　　　　　　　　　Commissioner of Patents